United States Patent
Kullen et al.

(10) Patent No.: US 11,059,346 B2
(45) Date of Patent: Jul. 13, 2021

(54) AIR CONDITIONER

(71) Applicant: Mahle International GmbH, Stuttgart (DE)

(72) Inventors: Philipp Kullen, Munich (DE); Holger Laux, Dietingen (DE); Erich Litwing, Spraitbach (DE)

(73) Assignee: Mahle International GmbH

( * ) Notice: Subject to any disclaimer, the term of this patent is extended or adjusted under 35 U.S.C. 154(b) by 171 days.

(21) Appl. No.: 16/504,279

(22) Filed: Jul. 7, 2019

(65) Prior Publication Data

US 2020/0016954 A1 Jan. 16, 2020

(30) Foreign Application Priority Data

Jul. 10, 2018 (DE) .......................... 102018211382.3

(51) Int. Cl.
| | | |
|---|---|---|
| *B60H 1/00* | (2006.01) | |
| *B21D 53/02* | (2006.01) | |
| *B60H 1/22* | (2006.01) | |

(52) U.S. Cl.
CPC ......... *B60H 1/00521* (2013.01); *B21D 53/02* (2013.01); *B60H 1/22* (2013.01); *B60H 2001/2287* (2013.01)

(58) Field of Classification Search
CPC .. B60H 1/00521; B60H 1/22; B60H 1/00571; B60H 1/00535; B60H 1/00507; B60H 1/00328; B60H 1/00335; B60H 2001/2287; B60H 2001/00635; B60H 3/0608; B60H 2003/0691; B21D 53/02; F16L 5/10

See application file for complete search history.

(56) References Cited

U.S. PATENT DOCUMENTS

| | | | |
|---|---|---|---|
| 2011/0127730 A1* | 6/2011 | Seryi ................... | B60R 13/0846 277/606 |
| 2013/0320102 A1* | 12/2013 | Litwing ................ | B60H 1/22 237/28 |
| 2017/0009912 A1* | 1/2017 | Berger ................ | B60R 13/0846 |

FOREIGN PATENT DOCUMENTS

| | | |
|---|---|---|
| DE | 602005002825 T2 | 7/2008 |
| DE | 102008036970 A1 | 2/2010 |
| DE | 102010062326 A1 | 6/2012 |
| FR | 2867422 A1 | 9/2005 |

OTHER PUBLICATIONS

English abstract for FR-2867422.
English abstract for DE-102008036970.
English abstract for DE-602005002825.

* cited by examiner

*Primary Examiner* — Emmanuel E Duke
(74) *Attorney, Agent, or Firm* — Fishman Stewart PLLC

(57) ABSTRACT

An air conditioner for air conditioning a vehicle interior of a motor vehicle, comprising a coolant connection, a refrigerant connection, a condensed water connection, and an air supply channel connection which are each arranged in a front coupling plate and are surrounded by a circumferential seal.

20 Claims, 1 Drawing Sheet

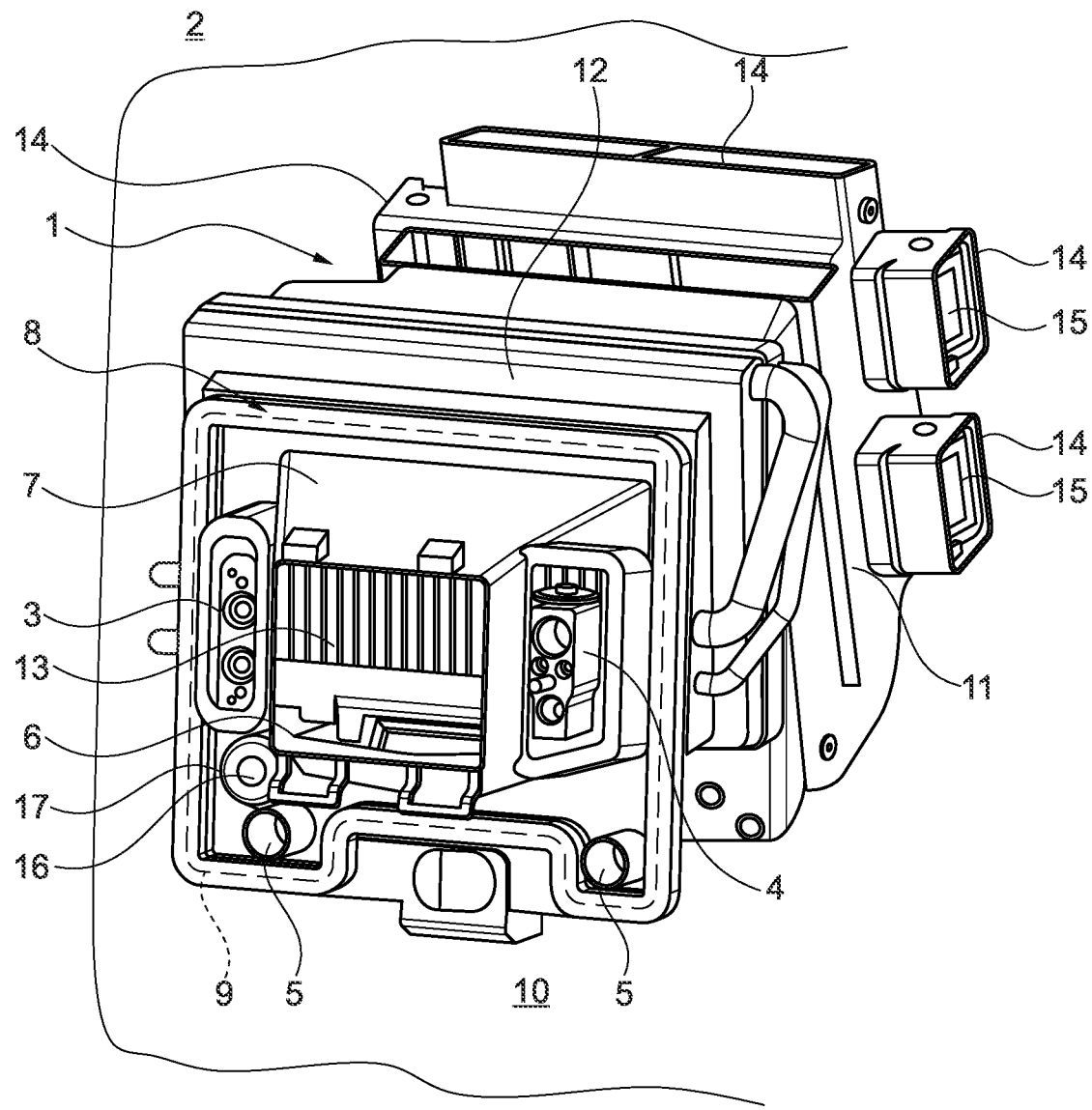

AIR CONDITIONER

CROSS-REFERENCE TO RELATED APPLICATION

This application claims priority to German Patent Application No. DE 10 2018 211 382.3, filed on Jul. 10, 2018, the contents of which are hereby incorporated by reference in its entirety.

TECHNICAL FIELD

The present invention relates to an air conditioner, in particular for air conditioning a vehicle interior of a motor vehicle. The invention furthermore relates to a motor vehicle comprising such an air conditioner.

BACKGROUND

Heaters/air conditioners (often also referred to as HVAC, heat-ventilation-air-condition) are typically installed in a vehicle interior of a motor vehicle. The fresh air supply as well as all connections for refrigerant and coolant lines thereby have to be guided through a front wall, which separates the vehicle interior from an engine compartment. Separately therefrom, additional tubes discharge the condensed water from the vehicle interior. However, each of these interfaces thereby requires its own seal, which does not only require a high sealing effort, but also a high assembly effort, because every lead-through through the front wall has to be sealed separately. In addition, individual apertures in the front wall have to thereby be provided for each line, whereby the front wall per se also requires an increased production effort. The production of the individual apertures as well as the noise-related effort and moisture-related sealing of each aperture thereby brings about additional costs.

SUMMARY

The present invention thus deals with the problem of specifying an air conditioner, which avoids the disadvantages known from the prior art, in particular in response to an installation into a motor vehicle.

This problem is solved according to the invention by means of the subject matter of the independent claim(s). Advantageous embodiments are the subject matter of the dependent claim(s).

The present invention is based on the general idea of bundling all connections of an air conditioner, such as, for example, refrigerant connection, condensed water connection, air supply channel connection, and coolant connection, and to guide them, bundled as line or channel bundle, respectively, through a single opening in a front wall of a motor vehicle. The air conditioner according to the invention thereby has the above-mentioned coolant connection, the refrigerant connection, the condensed water connection, as well as an air supply channel connection, all of which are now arranged, according to the invention, in a front coupling plate and are surrounded by a circumferential seal. In the case of the air conditioner according to the invention, only a single seal is thus required for sealing the through opening in a front wall separating a vehicle interior/passenger compartment form an engine compartment, whereby the sealing effort as well as the assembly effort can be reduced significantly. Due to the bundling of the individual lines in the front coupling plate, a single and larger through opening in the front wall of the motor vehicle, through which all lines or channels, respectively, of the air conditioner are guided in a bundled manner, is furthermore sufficient. The production costs of the front wall are thereby reduced as well. It is of particular advantage in the case of the air conditioner according to the invention, however, that a significant reduction of the susceptibility with regard to leakages can be attained due to the reduced number of the seals from currently n seals for n lines to only a single seal.

In the case of an advantageous further development of the solution according to the invention, the front coupling plate is embodied as plastic injection molded part. It is possible thereby to embody the front coupling plate not only in a cost-efficient manner, but simultaneously also with a high quality, wherein the individual receptacles for the respective connections, for example the refrigerant connection or the coolant connection, can be realized comparatively easily by means of a correspondingly designed plastic injection molding tool. It goes without saying that, purely theoretically, it is also conceivable to embody the front coupling plate of metal, in particular of sheet metal.

The air conditioner advantageously has a distributor housing, on which the front coupling plate is arranged. The distributor housing has at least two controllable air outlets, via which the fresh air, which is ejected from the air conditioner, can be distributed individually to individual passenger compartment areas. The front coupling plate can thereby be arranged directly on the distributor housing or also on an evaporator or condenser respectively, or a filter device, which are arranged between the front coupling plate and the distributor housing.

An adjustable flap is advantageously arranged in at least one air outlet of the distributor housing. Via such an adjustable flap, an air outlet can be controlled individually via a corresponding diffuser.

In the case of a further advantageous embodiment of the solution according to the invention, the air conditioner has a filter device. The fresh air, which flows into the passenger interior, can additionally be purified via such a filter device, which can be embodied, for example, as pollen filter. It goes without saying that the filter device can also have other filter materials, such as, for example, activated carbon, in order to separate other pollutants from the fresh air.

The present invention is further based on the general idea of specifying a motor vehicle, which has a front wall, which separates a vehicle interior from an engine compartment. At least one through opening is thereby provided in this front wall. In the case of the motor vehicle according to the invention, an air conditioner, which is described according to the preceding paragraphs, is also provided, which is attached to the through opening with its front coupling plate in such a way that the coolant connection, the refrigerant connection, the condensed water connection, and the air supply channel connection can be guided through the through opening, and the seal on the front coupling plate side rests on an edge of the through opening in a sealed manner. It is possible thereby to guide all connections or lines, respectively, of the air conditioner through the front wall by means of only a single seal and by means of only a single through opening in the front wall of the motor vehicle, wherein the production effort of the front wall can be reduced due to the only just one required through opening, and the assembly effort and the risk of leakages can simultaneously be reduced due to the only just one required seal.

Further important features and advantages of the invention follow from the subclaims, from the drawing, and from the corresponding FIGURE description on the basis of the drawing.

It goes without saying that the above-mentioned features and the features, which will be described below, cannot only be used in the respective specified combination, but also in other combinations or alone, without leaving the scope of the present invention.

A preferred exemplary embodiment of the invention is illustrated in the drawing and will be described in more detail in the following description.

BRIEF DESCRIPTION OF THE DRAWINGS

The sole FIGURE shows an air conditioner according to the invention.

DETAILED DESCRIPTION

According to the FIGURE, an air conditioner 1 according to the invention for air conditioning a vehicle interior of a motor vehicle 2 has a coolant connection 3, a refrigerant connection 4, a condensed water connection 5, as well as an air supply channel connection 6. The condensed water connection 5 can thereby have a condensed water drain and/or a condensed water connection piece. According to the invention, all of the above-mentioned connections 3, 4, 5, 6 are now arranged and bundled in a front coupling plate 7 and are simultaneously bordered or surrounded, respectively, by a circumferential seal 8. This provides the large advantage that all connections 3, 4, 5 and 6 can now be guided through a single, joint through opening 9, which, according to the FIGURE, is illustrated with a line, which is drawn in a broken manner, in a front wall 10. To date, individual through openings have been provided in the front wall 10 for the refrigerant lines, the coolant lines, the condensed water connection, and the air supply channel, all of which through openings had to be sealed individually, whereby not only the production effort for the front wall 10 was increased, but also the effort for sealing the individual through openings. Each individual seal and through opening furthermore represented its own risk for a leakage.

It is now possible by means of the air conditioner 1 according to the invention to only still provide a single through opening 9 in the front wall 10 of the motor vehicle 2, through which preferably all lines or connections 3, 4, 5, and 6, respectively, of the air conditioner 1 are guided and are sealed via a single, circumferential and joint seal 8. This represents a significant reduction with regard to a risk of a leakage as well as with regard to the costs and the assembly effort.

In the case of an advantageous further development of the solution according to the invention, the front coupling plate 7 is embodied as plastic injection molded part. It can thereby be produced in a comparatively simple, cost-efficient manner, but nonetheless with a high quality. As can further be gathered from the FIGURE, the air conditioner 1 has a distributor housing 11, on which the front coupling plate 7 is arranged. "Arranged" does not need to mean to be arranged directly on the distributor housing 11 in this case, but can also include an indirect arrangement, so that further components, such as, for example, a radiator 12 or a filter device 13, can be arranged in the case at hand, for example between the distributor housing 11 and the front coupling plate 7. Such a radiator 12 can be embodied, for example, as evaporator.

When further looking at the distributor housing 11 of the air conditioner 1 according to the invention, it can be seen that it has at least two controllable air outlets 14, wherein an adjustable flap 15 for regulating the volume flow flowing in the respective air outlet 14 is arranged in at least one of these air outlets 14.

At least one opening 16 for guide-through of at least one electrical line can furthermore be provided in the front coupling plate 7. To seal the opening 16, provided that an electrical line is guided through, at least one seal 17 can be provided.

The invention is to also capture the motor vehicle 2 comprising the air conditioner 1 according to the invention, wherein, in a front wall 10, which separates an engine compartment and a passenger compartment, the above-described through opening 9 is arranged, which, in the case at hand, is dimensioned to be so large that all supply lines or connections 3, 4, 5, 6, respectively, of the air conditioner 1 can be guided through in a bundled manner. The seal 8 thereby rests on an edge of the through opening 9 in a sealed manner. Due to the fact that only a single seal 8 is still required in the case at hand, the susceptibility with regard to leakages can also be reduced in addition to a reduction of the diversity of parts.

The invention claimed is:

1. An air conditioner for air conditioning a vehicle interior of a motor vehicle, comprising a coolant connection, a refrigerant connection, a condensed water connection, and an air supply channel connection which are each arranged in a front coupling plate and are surrounded by a circumferential seal.

2. The air conditioner according to claim 1, wherein the front coupling plate is structured as a plastic injection molded part.

3. The air conditioner according to claim 1, further comprising a distributor housing, on which the front coupling plate is arranged.

4. The air conditioner according to claim 3, wherein the distributor housing includes at least two controllable air outlets.

5. The air conditioner according to claim 4, wherein at least one of the at least two air outlets includes an adjustable flap (15) is arranged therein.

6. The air conditioner according to claim 1, further comprising a filter device.

7. The air conditioner according to claim 1, wherein the front coupling plate includes at least one opening for guide-through of at least one electrical line.

8. The air conditioner according to claim 7, further comprising at least one seal structured and arranged to seal the at least one electrical line in the at least one opening.

9. A motor vehicle, comprising:
an air conditioner including a coolant connection, a refrigerant connection, a condensed water connection, and an air supply channel connection which are each arranged in a front coupling plate and are surrounded by a circumferential seal;
a front wall separating a vehicle interior from an engine compartment, the front wall including a through opening;
wherein the air conditioner is attached to the through opening via the front coupling plate such that the coolant connection, the refrigerant connection, the condensed water connection, and the air supply channel connection are guided through the through opening, and the circumferential seal rests on an edge of the through opening in a sealed manner.

10. The motor vehicle according to claim 9, wherein the front coupling plate is structured as a plastic injection molded part.

11. The motor vehicle according to claim 9, wherein the air conditioner further includes a distributor housing on which the front coupling plate is arranged.

12. The motor vehicle according to claim 11, wherein the distributor housing includes at least two controllable air outlets.

13. The motor vehicle according to claim 12, wherein at least one of the at least two air outlets includes an adjustable flap arranged therein.

14. The motor vehicle according to claim 9, wherein the air conditioner further includes a filter device.

15. The motor vehicle according to claim 9, wherein the front coupling plate includes at least one opening through which at least one electrical line is guidable.

16. The motor vehicle according to claim 15, wherein the air conditioner further includes at least one seal structured and arranged to seal the at least one electrical line in the at least one opening.

17. An air conditioner for air conditioning a vehicle interior of a motor vehicle, comprising:

a front coupling plate;

a plurality of connections arranged within the front coupling plate; and a coupling plate seal arranged on the front coupling plate surrounding the plurality of connections;

wherein the plurality of connections includes a coolant connection, a refrigerant connection, a condensed water connection, and an air supply channel connection.

18. The air conditioner according to claim 17, further comprising a distributor housing on which the front coupling plate is arranged.

19. The air conditioner according to claim 18, further comprising a radiator disposed between the front coupling plate and the distributor housing.

20. The air conditioner according to claim 17, wherein the front coupling plate includes at least one opening through which at least one electrical line is guidable and at least one opening seal structured and arranged to seal the at least one electrical line within the at least one opening.

* * * * *